(12) United States Patent
Mehrotra et al.

(10) Patent No.: US 10,988,142 B1
(45) Date of Patent: Apr. 27, 2021

(54) DETERMINING FRICTION COEFFICIENT OF A TIRE/SURFACE INTERFACE

(71) Applicants: Prateek Mehrotra, Sunnyvale, CA (US); Christopher D. Gadda, Palo Alto, CA (US)

(72) Inventors: Prateek Mehrotra, Sunnyvale, CA (US); Christopher D. Gadda, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 188 days.

(21) Appl. No.: 16/143,633

(22) Filed: Sep. 27, 2018

Related U.S. Application Data

(60) Provisional application No. 62/563,952, filed on Sep. 27, 2017.

(51) Int. Cl.
| | | |
|---|---|---|
| *B60W 40/00* | (2006.01) | |
| *B60W 40/068* | (2012.01) | |
| *B60W 10/22* | (2006.01) | |
| *B60W 10/08* | (2006.01) | |
| *B60W 30/18* | (2012.01) | |
| *B60W 10/20* | (2006.01) | |

(52) U.S. Cl.
CPC .......... *B60W 40/068* (2013.01); *B60W 10/08* (2013.01); *B60W 10/20* (2013.01); *B60W 10/22* (2013.01); *B60W 30/18172* (2013.01); *B60W 2710/083* (2013.01); *B60W 2710/207* (2013.01); *B60W 2710/22* (2013.01); *B60W 2720/30* (2013.01); *B60Y 2200/91* (2013.01)

(58) Field of Classification Search
CPC .... B60W 40/068; B60W 10/08; B60W 10/20; B60W 10/22; B60W 30/18172; B60W 2710/083; B60W 2710/207; B60W 2710/22; B60W 2720/30; B60Y 2200/91
USPC .......................................................... 701/22
See application file for complete search history.

(56) References Cited

U.S. PATENT DOCUMENTS

2011/0307129 A1* 12/2011 Yu ...................... B60L 15/2036
701/22
2017/0137023 A1* 5/2017 Anderson ............. B60W 50/14

OTHER PUBLICATIONS

Beal, C.E., "Independent Wheel Effects in Real Time Estimation of Tire-Road Friction Coefficient from Steering Torque", IFAC-PapersOnLine 49-11 (2016), pp. 319-326 (8 pp).

* cited by examiner

*Primary Examiner* — James M McPherson
*Assistant Examiner* — Tiffany P Ohman
(74) *Attorney, Agent, or Firm* — Young Basile Hanlon & MacFarlane, P.C.

(57) ABSTRACT

A method for controlling a vehicle includes applying torque to a set of tires to cause the vehicle to move along a surface, reducing an amount of downward force applied to the surface by a first tire from the set of tires using an active suspension component, and actuating the first tire to control the dynamic response of the first tire relative to the surface. The method also includes determining a traction force of the first tire relative to the surface at each of multiple values for the dynamic response of the first tire relative to the surface, and determining a maximum available traction force based on the multiple values of the dynamic response and the corresponding values for the traction force. The method also includes determining a friction parameter based on the maximum available traction force, and controlling an operation of the vehicle based on the friction parameter.

20 Claims, 9 Drawing Sheets

DETERMINING FRICTION COEFFICIENT OF A TIRE/SURFACE INTERFACE

CROSS-REFERENCE TO RELATED APPLICATIONS

This application claims the benefit of U.S. Provisional Application No. 62/563,952, filed on Sep. 27, 2017, the content of which is hereby incorporated by reference in its entirety for all purposes.

TECHNICAL FIELD

The present disclosure relates systems and methods for determining a friction parameter, such as a maximum available traction force or a friction coefficient of a tire/surface interface, to control operation of a vehicle.

BACKGROUND

A tire generates a traction force through compression and expansion of the tire body and via its interaction with an underlying surface (e.g., road). During acceleration, deceleration, and turning of a vehicle, the tire will slide with respect to the surface in addition to rolling, and this sliding is referred to as wheel slip. The amount of longitudinal sliding may be expressed as a slip ratio, which is the relative difference between the tire's rotational velocity and the achieved translational velocity. The amount of lateral sliding may be expressed as a slip angle, which is an angular difference between the direction that the tire is pointing and the direction that the vehicle is moving. The traction force generated by the tire is a non-linear function of the slip ratio and the slip angle.

SUMMARY

One aspect of the disclosure is a method for controlling a vehicle having a set of tires. The method includes applying torque to one or more tires from the set of tires to cause the vehicle to move along a surface, reducing an amount of downward force applied to the surface by a first tire from the set of tires using an active suspension component, and subsequent to reducing the amount of downward force applied to the surface by the first tire, actuating the first tire to control a dynamic response of the first tire relative to the surface. The method also includes determining, while actuating the first tire, a traction force of the first tire relative to the surface at each of multiple values for the dynamic response of the first tire relative to the surface, determining a maximum available traction force based on the multiple values of the dynamic response and corresponding values for the traction force, determining a friction parameter based on the maximum available traction force, and controlling an operation of the vehicle based on the friction parameter.

In some implementations of the method, the dynamic response of the first tire is a longitudinal slip ratio. In some implementations of the method, actuating the first tire to control the dynamic response of the first tire relative to the surface includes changing an amount of torque applied to the first tire. In some implementations of the method, actuating the first tire to control the dynamic response of the first tire relative to the surface includes changing a braking torque applied to the first tire. In some implementations of the method, actuating the first tire to control the dynamic response of the first tire relative to the surface includes steering the first tire to maintain a lateral traction force equal to approximately zero while changing a longitudinal traction force.

In some implementations of the method, the dynamic response of the first tire is a slip angle. In some implementations of the method, actuating the first tire to control the dynamic response of the first tire relative to the surface includes changing a steering angle of the first tire. In some implementations of the method, actuating the first tire to control the dynamic response of the first tire relative to the surface includes changing a torque applied to the first tire to maintain a longitudinal traction force equal to approximately zero while changing the lateral traction force.

In some implementations of the method, the dynamic response of the first tire includes a longitudinal slip ratio and a slip angle, and actuating the first tire to control the dynamic response of the first tire relative to the surface includes at least one of changing a torque applied to the first tire, changing a braking torque applied to the first tire, or changing a steering angle of the first tire.

In some implementations of the method, the method includes actuating one or more tires from the set of tires to apply a counter-moment in opposition to a moment resulting from actuating the first tire to control the dynamic response of the first tire relative to the surface.

Another aspect of the disclosure is a vehicle that includes a set of tires that includes a first tire, one or more motors that are configured to apply torque to one or more tires from the set of tires, an active suspension component that is configured to control an amount of downward force that is applied to the first tire; and a controller that executes a set of instructions. The instructions cause the controller to apply torque to one or more tires from the set of tires to cause the vehicle to move along a surface, reduce an amount of downward force applied to the surface by a first tire from the set of tires using an active suspension component, actuate the first tire to control a dynamic response of the first tire relative to the surface while the downward force applied to the surface by the first tire is reduced, determine a traction force of the first tire relative to the surface at each of multiple values for the dynamic response of the first tire relative to the surface during actuation of the first tire, determine a maximum available traction force based on the multiple values of the dynamic response and corresponding values for the traction force, determine a friction parameter based on the maximum available traction force, and control an operation of the vehicle based on the friction parameter.

In some implementations of the vehicle, the dynamic response of the first tire is a longitudinal slip ratio and actuation the first tire to control the dynamic response of the first tire relative to the surface includes at least one of changing an amount of torque applied to the first tire or changing a braking torque applied to the first tire.

In some implementations of the vehicle, the dynamic response of the first tire is a slip angle and actuation of the first tire to control the dynamic response of the first tire relative to the surface includes changing a steering angle of the first tire and changing a torque applied to the first tire to maintain a longitudinal traction force equal to approximately zero while changing a lateral traction force.

In some implementations of the vehicle, the dynamic response of the first tire includes a longitudinal slip ratio and a slip angle, and actuation of the first tire to control the dynamic response of the first tire relative to the surface includes at least one of changing a torque applied to the first tire, changing a braking torque applied to the first tire, or changing a steering angle of the first tire.

In some implementations of the vehicle, the instructions further cause the controller to actuate one or more tires from the set of tires to apply a counter-moment in opposition to a moment resulting from actuation of the first tire to control the dynamic response of the first tire relative to the surface.

Another aspect of the disclosure is a non-transitory computer readable media including program instructions. The program instructions, when executed by a processor, cause the processor to perform operations. The operations include applying torque to one or more tires from a set of tires to cause a vehicle to move along a surface, reducing an amount of downward force applied to the surface by a first tire from the set of tires using an active suspension component, and subsequent to reducing the amount of downward force applied to the surface by the first tire, actuating the first tire to control a dynamic response of the first tire relative to the surface. The operations also include determining, while actuating the first tire, a traction force of the first tire relative to the surface at each of multiple values for the dynamic response of the first tire relative to the surface, determining a maximum available traction force based on the multiple values of the dynamic response and corresponding values for the traction force, determining a friction parameter based on the maximum available traction force, and controlling an operation of the vehicle based on the friction parameter.

In some implementations of the non-transitory computer readable media, the dynamic response of the first tire is a longitudinal slip ratio and actuating the first tire to control the dynamic response of the first tire relative to the surface includes at least one of changing an amount of torque applied to the first tire or changing a braking torque applied to the first tire.

In some implementations of the non-transitory computer readable media, the dynamic response of the first tire is a slip angle and actuating the first tire to control the dynamic response of the first tire relative to the surface includes changing a steering angle of the first tire and changing a torque applied to the first tire to maintain a longitudinal traction force equal to approximately zero while changing a lateral traction force.

In some implementations of the non-transitory computer readable media, the dynamic response of the first tire includes a longitudinal slip ratio and a slip angle, and actuating the first tire to control the dynamic response of the first tire relative to the surface includes at least one of changing a torque applied to the first tire, changing a braking torque applied to the first tire, or changing a steering angle of the first tire.

In some implementations of the non-transitory computer readable media, the operations also include actuating one or more tires from the set of tires to apply a counter-moment in opposition to a moment resulting from actuating the first tire to change the traction force applied to the surface by the first tire.

DETAILED DESCRIPTION

Figure 1A:
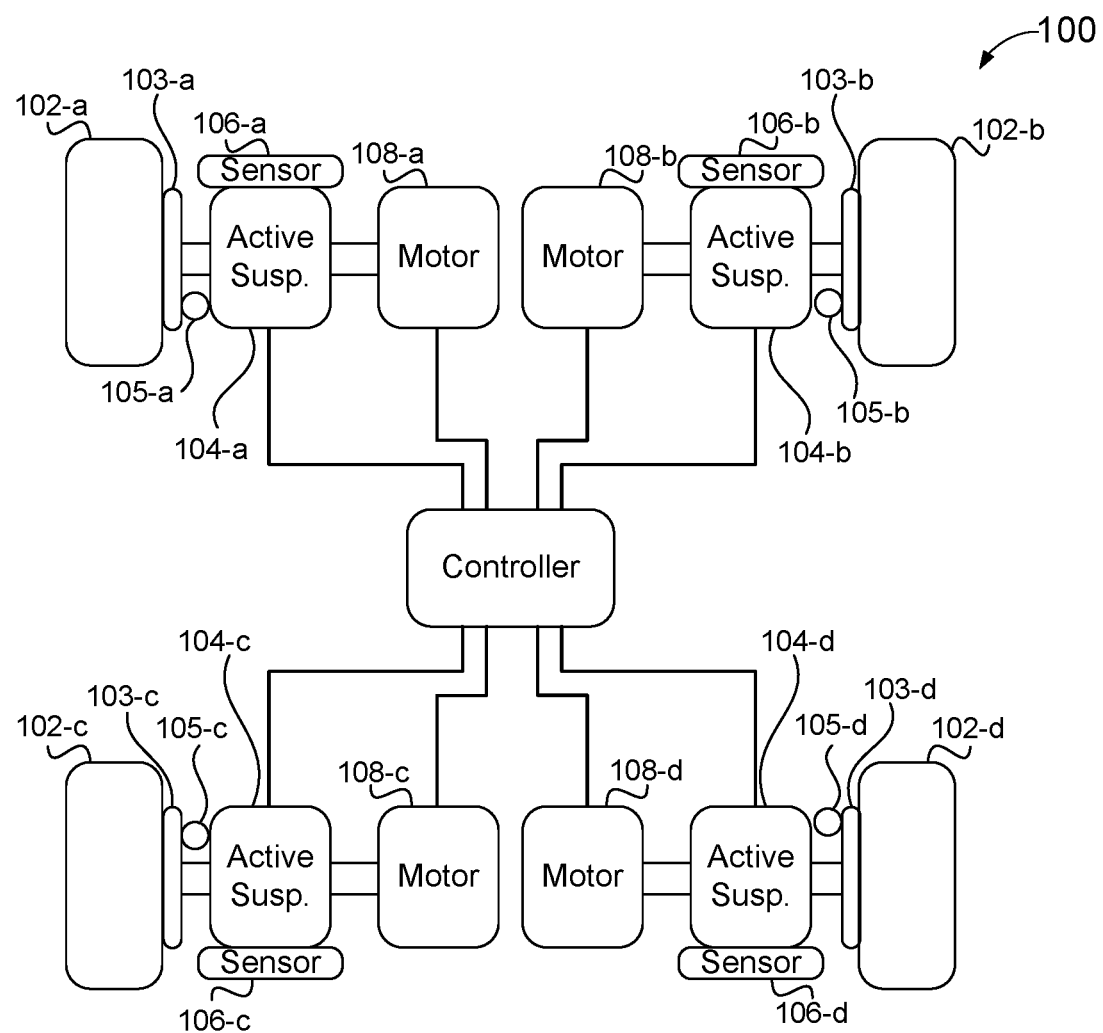
FIG. 1A is a schematic that illustrates an example set of components of a vehicle according to some implementations of the present disclosure.

A traction force (also referred to as a "tractive force") is the force used to generate motion between a body and a tangential surface via the dry friction between the body and the surface. In the case of an automobile, the traction force is the force used to generate motion between the tire and the surface (e.g., a road).

The traction force between a tire and a surface is dependent upon tire properties, surface properties, and the slip ratio and slip angle. For a given pairing of tire and surface properties, a relationship can be defined between the traction force and the slip ratio and slip angle. When the tire is rolling without slipping relative to the surface, the slip ratio and slip angle are zero and no traction force is generated. As the absolute value of wheel slip increases, the available traction force will approach a maximum absolute value.

The maximum available traction force is dependent on a number of different factors and determining the maximum available traction force in real-time often proves difficult. Knowledge of the maximum available traction force at a tire/surface interface may be helpful in many different circumstances, including determining a coefficient of friction of the road/surface interface. Further, knowledge of real-time friction parameters such as the coefficient of friction of the tire/surface interface and/or data acquired by other vehicle sensors may allow better planning of vehicle trajectories.

The coefficient of friction indicates the impact of friction between two objects (e.g., a tire and a surface). As used herein, the terms "coefficient of friction" and "friction parameter" are inclusive of isotropic and non-isotropic representations of the impact of friction between two objects. In the context of an automobile, the coefficient of friction (or a parameter that is indicative of the coefficient of friction) may be used to warn a driver of a hazardous condition. Additionally or alternatively, the coefficient of friction (or a parameter that is indicative thereof) may be used to automatically control the vehicle. For example, in the context of an autonomous vehicle, the friction coefficient may be used to determine whether to brake and/or swerve to avoid a collision. For instance, an autonomous vehicle may be rapidly approaching an object in the middle of the road. If the road has a very low coefficient of friction, the logic of the autonomous vehicle may instruct the vehicle to veer to the right or left, rather than quickly applying the brakes of the vehicle.

According to some implementations of the present disclosure, a vehicle is configured to determine a friction parameter by utilizing the active suspension of the vehicle. A friction parameter can refer to any value that may be indicative of the coefficient of friction of the tire/surface interface. As examples, term "friction parameter" may refer to a coefficient of friction of a road/surface interface, a maximum available traction force of a tire/surface interface, or any other value that may be used to derive the coefficient of friction.

The systems and methods herein relate to friction estimation methods that utilize one or more wheels of the vehicle to estimate the friction parameter. The one or more wheels that are used to estimate the friction parameter may be referred to as a sensing wheel or as sensing wheels. The one or more wheels of the vehicle may be controlled in a way so as to reduce the downward force Fz they apply to the road surface or other surface that they are on. As examples, the one or more wheels of the vehicle may be controlled to reduce or increase downward force by using active suspension capabilities, the one or more wheels of the vehicle may be actively and independently steered to control a slip angle of the one or more wheels, and/or the drive torque that is applied to the one more or more wheels can be modified to control the angular velocity, wheel slip, and/or traction force generation capability of the one or more wheels.

Reducing the downward force applied to the road surface by the one or more wheels reduces the traction force that the one or more wheels generate at the tire-road interface. The traction force consists of a longitudinal and a lateral component. The longitudinal traction force Fx (i.e., the longitudinal component of the traction force) is dependent in part upon the downward force and the wheel slip ratio. The lateral traction force Fy (i.e., the lateral component of the traction force) is dependent in part upon the downward force and the wheel slip angle. The traction force and downward force Fz form the relationship described by Equation 1 through the friction coefficient mu.

$$\max((Fx)^2+(Fy)^2)=mu^2*(Fz)^2 \quad (1)$$

The relationship described by Equation 1 can be visualized in a simplified form as a friction boundary in the form of a circle having a radius that is a function of the friction coefficient mu and the downward force Fz. The friction boundary represents the limits of traction that are supported by the friction coefficient mu and the downward force Fz. The longitudinal traction force Fx can be plotted relative to the friction circle along a first axis (e.g., a vertical axis) and the lateral traction force Fy can be plotted on a second axis (e.g., a horizontal axis) to locate the traction force (as defined by its components, the longitudinal traction force Fx and the lateral traction force Fy) relative to the friction circle. In reality, the limits of traction will not correspond perfectly to a circular shape, and the friction boundary may instead be elliptical or irregular, or any analytically defined shape. The actual shape of the friction boundary is dependent on factors that influence the amount of available friction, such as tire characteristics. Thus, the friction boundary could also be an ellipse or any other analytically defined function. For example, the friction boundary could be two half ellipses that are different in characteristics for throttle vs braking and Equation 1 could be modified to represent this. Non-analytical forms could also be approximated by modifications of Equation 1.

Using the relationship described in Equation 1, the friction coefficient mu can be estimated by determining the limits of traction by perturbing one or more of the wheels. When the downward force Fz is high, the limits of traction are high, and it is not practical to attempt to determine the limits of traction, for example, by controlling the vehicle to increase or decrease the longitudinal traction force Fx or the lateral traction force Fy. However, by reducing the downward force Fz that is applied to one or more wheels, the friction boundary becomes smaller, and the limits of traction can be reached more readily, for example, by smaller perturbations of the longitudinal traction force Fx or the lateral traction force Fy with respect to the one or more wheels, which allows for testing to be performed using the one or more wheels in order to determine the friction boundary.

At the origin of the friction boundary, the lateral traction force Fy and the longitudinal traction force Fx are equal to zero. By torque actuating the wheel and using a longitudinal slip controller to target a variety of slip ratios, the longitudinal traction force Fx changes and will ultimately reach the friction boundary. Collecting these data points and plotting them results in a force versus slip ratio curve. Using a variety of methods, the peak of this curve can be estimated, which allows determination of the friction boundary. Although extensive testing and data collection can be performed using the one or more wheels to identify all slip ratios and the maximum traction forces that represent the friction boundary, in practice, suitable results can be obtained using a smaller number of slip ratios sampled at traction forces that are well within the friction boundary and using the data obtained from these samples to estimate the friction boundary.

In one implementation, while maintaining a certain value for the lateral traction force Fy (i.e., some non-zero value on the Fy axis relative to the friction boundary) using the one or more sensing wheels, a variety of slip ratios can be generated using a longitudinal slip controller and torque actuating the sensing wheel, which changes the traction force along the Fx axis by changing the longitudinal traction force Fx until the friction boundary is encountered (e.g., loss of traction occurs). Using this data, the peak of the force versus slip ratio curve can be estimated, and friction can be estimated using the peak value based on Equation 1.

In another implementation, the lateral traction force Fy can be controlled while maintaining the longitudinal traction Fx equal to zero. As an example, the lateral traction force can be controlled by changing the steering angle of the one or more sensing wheels to generate various slip angles, thereby generating a variety of magnitudes for the lateral traction force Fy, which can be determined by estimation or by measurement, for example, using a tie-rod force sensor or other suitable sensors or sensing methods. Using the data collected for a number of different magnitudes for the lateral traction force Fy, the peak of the force versus slip ratio curve can be estimated, and friction can be estimated using the peak value based on Equation 1.

In another implementation, both the lateral traction force Fy and the longitudinal traction force Fx can be controlled simultaneously, for example, by simultaneously controlling the steering angle and the slip ratios of the one or more wheels to collect data corresponding to multiple values of the lateral traction force Fy and the longitudinal traction force Fx. Using this data, the peak of the force versus slip ratio curve can be estimated, and friction can be estimated using the peak value based on Equation 1.

Generally, the systems and methods described herein actuate the one or more wheels with respect to various degrees of freedom to target a variety of slip ratios and slip angles to collect sufficient data for estimating the peak of the force versus friction curve, which is then used to determine the friction parameter, for example, using Equation 1.

In operation, the vehicle controls the active suspension to decrease the downward force that is applied by at least one of the tires to the road surface. Upon reducing the downward force, the vehicle can control actuation of one of the tires to achieve certain slip ratios and/or slip angles. In this way, the vehicle can monitor the slip ratio while determining (e.g., by measuring or estimating) traction forces to determine a maximum available traction force. The maximum available traction force is the greatest amount of tractive force that can be achieved at the tire/surface interface, given the downward force being applied to a tire and the coefficient of friction of the road. Based on the maximum available traction force, the vehicle can determine the coefficient of friction. In the context of an autonomous vehicle, knowledge of these parameters can be helpful when planning a vehicle trajectory, taking turns, avoiding an obstacle, or operating the vehicle in general.

FIG. 1A illustrates an example set of components of a vehicle 100 configured to determine a friction parameter relating to a tire/surface interface of the vehicle 100. In the illustrated example, the vehicle 100 includes a front left tire 102-a, a front right tire 102-b, a rear left tire 102-c, and a rear right tire 102-d (generically referred to as tire 102 or collectively as tires 102).

In the illustrated example, the vehicle 100 also includes friction brakes such as a first braking component 103-a that corresponds to the front left tire 102-a, a second braking component 103-b that corresponds to the front right tire 102-b, a third braking component 103-c that corresponds to the rear left tire 102-c, and a fourth braking component 103-d that corresponds to the rear right tire 102-d (generically referred to as braking component 103 or collectively as braking components 103).

In the illustrated example, the vehicle 100 also includes a first active suspension component 104-a that corresponds to the front left tire 102-a, a second active suspension component 104-b that corresponds to the front right tire 102-b, a third active suspension component 104-c that corresponds to the rear left tire 102-c, and a fourth active suspension component 104-d that corresponds to the rear right tire 102-d (generically referred to as active suspension component 104 or collectively as active suspension components 104).

In the illustrated example, the vehicle 100 also includes a first steering component 105-a that corresponds to the front left tire 102-a, a second steering component 105-b that corresponds to the front right tire 102-b, a third steering component 105-c that corresponds to the rear left tire 102-c, and a fourth steering component 105-d that corresponds to the rear right tire 102-d (generically referred to as a steering component 105 or collectively as the steering components 105). The steering components may be any type of actuation system that is operable to change the steering angle of a respective one of the tires 102, including independent and dependent steering arrangements, and may include conventional steering devices, such as per-wheel independent steering actuators or a rack-and-pinion system.

In the illustrated example, the vehicle 100 also includes a first weight sensor 106-a that corresponds to the front left tire 102-a, a second weight sensor 106-b that corresponds to the front right tire 102-b, a third weight sensor 106-c that corresponds to the rear left tire 102-c, and a fourth weight sensor 106-d that corresponds to the rear right tire 102-d (generically referred to as weight sensor 106 or collectively as weight sensors 106).

In the illustrated example, the vehicle 100 also includes a first motor 108-a that corresponds to the front left tire 102-a, a second motor 108-b that corresponds to the front right tire 102-b, a third motor 108-c that corresponds to the rear left tire 102-c, and a fourth motor 108-d that corresponds to the rear right tire 102-d (generically referred to as motor 108 or collectively as motors 108).

Each tire 102 may include a wheel (not shown) and may have a respective active suspension component 104 coupled to the wheel. In some implementations, each active suspension component 104 has a weight sensor 106 that is configured to output a signal that indicates an amount of force being applied to the respective tire 102 by, for example, the body of the vehicle 100. For example, the first weight sensor 106-a may indicate an amount of downward force being applied to the front left tire 102-a. In some implementations, each respective tire 102 may be turned by a respective motor 108. In other implementations, a single motor 108 may turn two tires 102 connected by an axle, whereby a differential (not shown) may control the rotational velocity of each respective tire 102. A controller 110 controls the motor(s) 108 and the active suspension component(s) 104, amongst other components of the vehicle 100.

The active suspension components 104 may refer to any vehicle suspension that actively controls the vertical movement of the tires/wheels with respect to the vehicle body (not shown). In some implementations, each active suspension component 104 may include a linear actuator that controls the amount of downward force being transferred to the respective tire 102 from the vehicle body. Each of the active suspension components 104 may receive a control signal from the controller 110 that causes force to be applied using the linear actuator according to a magnitude and direction determined by the controller 110, which ultimately has the effect of changing the force applied by the tire 102 to the surface. In some implementations, two or more of the active suspension components 104 may receive a control signal from the controller 110 that controls the amount of downward force being transferred to the respective tires 102. When reducing the amount of downward force being applied to a particular tire 102, the respective active suspension component 104 may apply an upward force to the tire 102, whereby the end result is a reduction in the weight of the vehicle that is borne by the tire 102. In this way, the active suspension components 104 may be manipulated to have the weight of the vehicle 100 unequally distributed across the four tires 102 of the vehicle 100.

The controller 110 is operable to issues control signals that cause one or more of the motors 108 to apply torque (positive or negative) to accelerate or decelerate the tires 102. A motor 108 may include a longitudinal slip control component. The longitudinal slip control components are configured to target certain slip values and to monitor the slip ratio of the tire 102 during operation of the vehicle 100.

The controller 110 may be any suitable vehicle control unit. In some implementations, the controller 110 may be a collection of electronic control units that that communicate via a protocol (e.g., controller area network bus protocol). The controller 110 may include one or more processors that execute computer-readable instructions. Additionally or alternatively, the controller 110 may include one or more integrated circuits that are configured to perform specific functions relating to the operation of the vehicle 100. The controller 110 may receive sensor input from various vehicle components, including the sensor 106. Amongst other things, the controller 110 may control the active suspension components 104 and the motor(s) 108 of the vehicle 100.

For purposes of calculating a friction parameter, the controller 110 is configured to control the active suspension components 104 of the vehicle 100, such that active suspension component 104 reduces the downward force applied to one of the tires 102. Upon reducing the downward force from one of the tires 102, the controller 110 actuates the tire 102 to change the longitudinal slip ratio and/or the slip angle, by control of the motor 108, the braking component 103 and/or the steering component 105 that is associated with the tire 102. For example, the controller 110 may output control signals that cause the motor 108 associated with the tire 102 to modulate the torque being applied to the tire 102. The controller 110 monitors the slip ratio and/or the slip angle of the tire 102, as well as other properties, such as the torque applied to the tire 102. In modulating the torque and monitoring the slip ratio and/or the slip angle, the controller 110 can estimate the maximum available traction force at the tire/surface interface. The controller 110 can then determine a friction parameter corresponding to the tire/surface interface based on the maximum available traction force. This may be the maximum available traction force itself, or the coefficient of friction of the at the tire/surface interface.

Figure 1B:
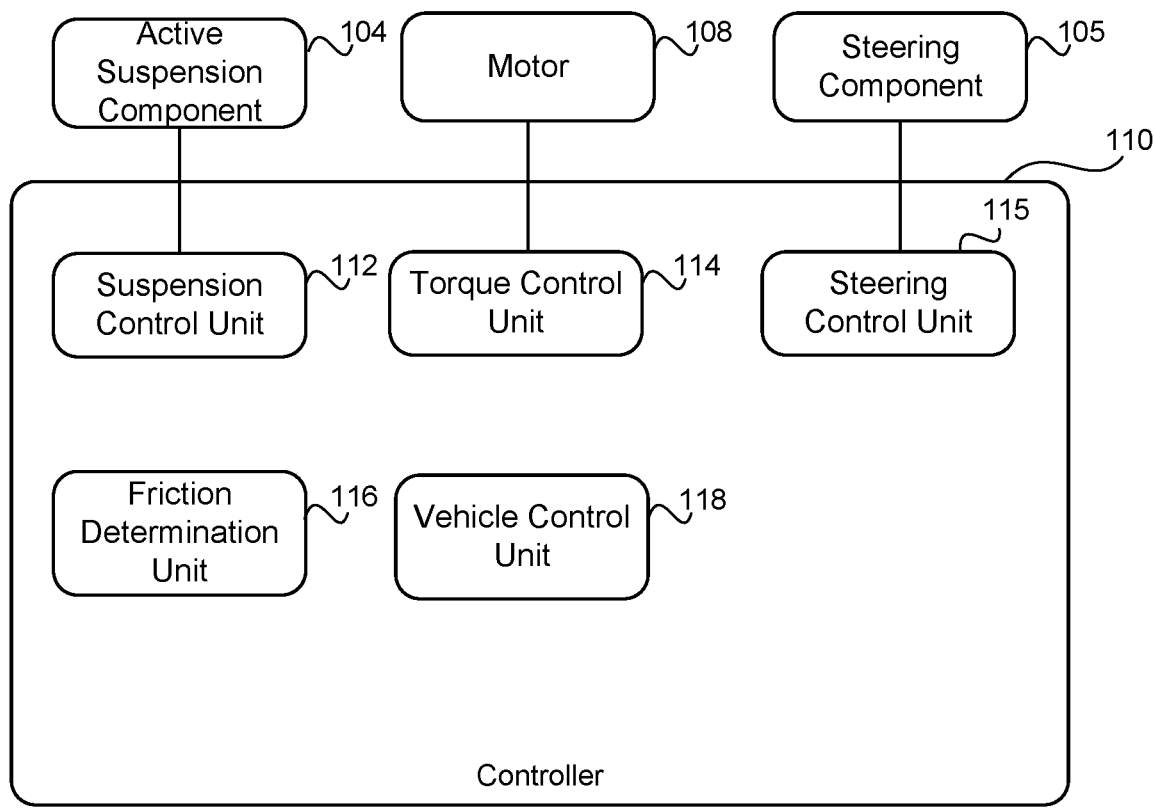
FIG. 1B is a schematic that illustrates an example set of components of a controller of a vehicle according to some implementations of the present disclosure.

FIG. 1B illustrates an example controller 110 according to some implementations of the present disclosure. The controller 110 may include computing units such as a suspension control unit 112, a torque control unit 114, a steering control unit 115, a friction determination unit 116, and a vehicle control unit 118. The controller 110 may include additional or alternative units that are not described herein.

As used throughout the disclosure, the various units of the present disclosure may include any discrete and/or integrated electronic circuit components that implement analog and/or digital circuits capable of producing the functions attributed to the units herein. For example, the units may include analog circuits (e.g., amplification circuits, filtering circuits, analog/digital conversion circuits, and/or other signal conditioning circuits). The units may also include digital circuits (e.g., combinational or sequential logic circuits, memory circuits, etc.). Memory may include any volatile, non-volatile, magnetic, or electrical media, such as a random-access memory (RAM), read-only memory (ROM), non-volatile RAM (NVRAM), electrically-erasable programmable ROM (EEPROM), Flash memory, or any other memory device. Furthermore, memory may include instructions that, when executed by one or more processing circuits, cause the units to perform various functions attributed to the units herein. The units may additionally include one or more processors that execute instructions, whereby the instructions cause the one or more processors to perform one or more respective functions. The electronics of the devices described herein are only example electronics. As such, the types of electronic components used to implement the electronics may vary based on design considerations.

In operation, the vehicle control unit 118 may request a friction parameter corresponding to a tire/surface interface during operation of the vehicle. In response to such a request, the friction determination unit 116 may operate in conjunction with the suspension control unit 112, the torque control unit 114, and the steering control unit 115 to determine the friction parameter.

Upon receiving a request for a friction parameter, the friction determination unit 116 can issue a command to the suspension control unit 112 to cause one of the active suspension components 104 to reduce the force applied to the surface by one of the tires 102. In response to the command, the suspension control unit 112 controls the active suspension component 104 to reduce the force applied to the surface by the tire 102. The suspension control unit 112 can activate a linear actuator redistribute some of the downward force being applied to the tire 102 to other ones of the tires 102. In some implementations, the linear actuator may be a linear or nonlinear actuator of any type, including but not limited to: ball screw, hydraulic, pneumatic, voice coil, mechanical, or electro mechanical actuator. In a sense, the active suspension component 104 slightly pulls on the wheel that is coupled to the tire 102 (e.g., through a suspension knuckle). By doing so, some of the weight that is being supported by the tire 102 is distributed to the other tires 102 of the vehicle 100. In doing so, the downward force being applied to the tire 102 is reduced. As the maximum available traction force is essentially proportional to the downward force being applied to the tire, the maximum available traction force corresponding to the tire/surface interface is reduced.

Figure 2A:
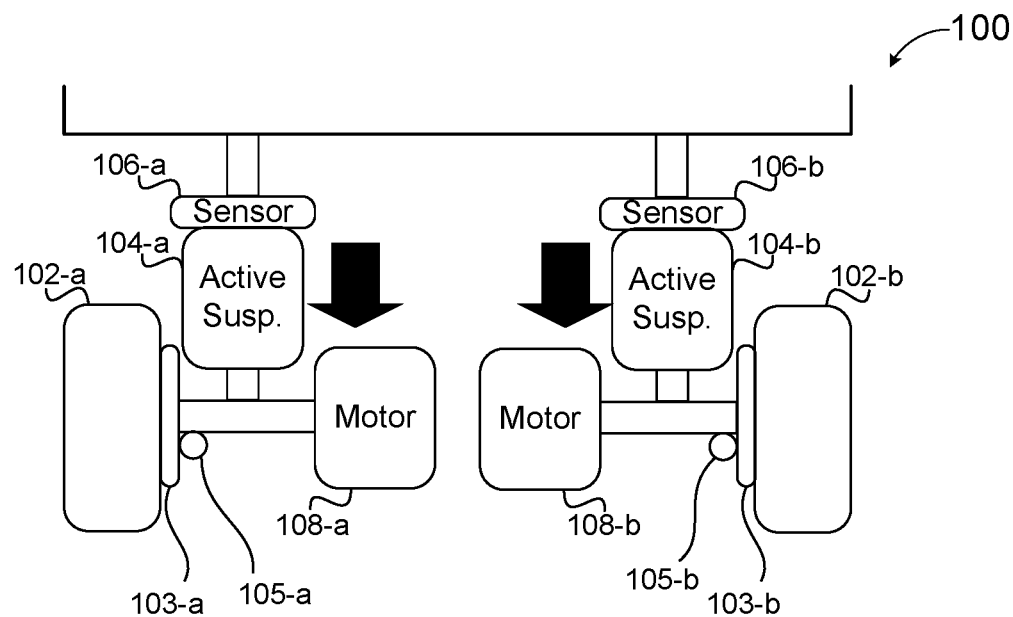
FIGS. 2A and 2B are schematics that illustrate an example of a downward force being reduced from a first tire and being distributed to a second tire.
Figure 2B:
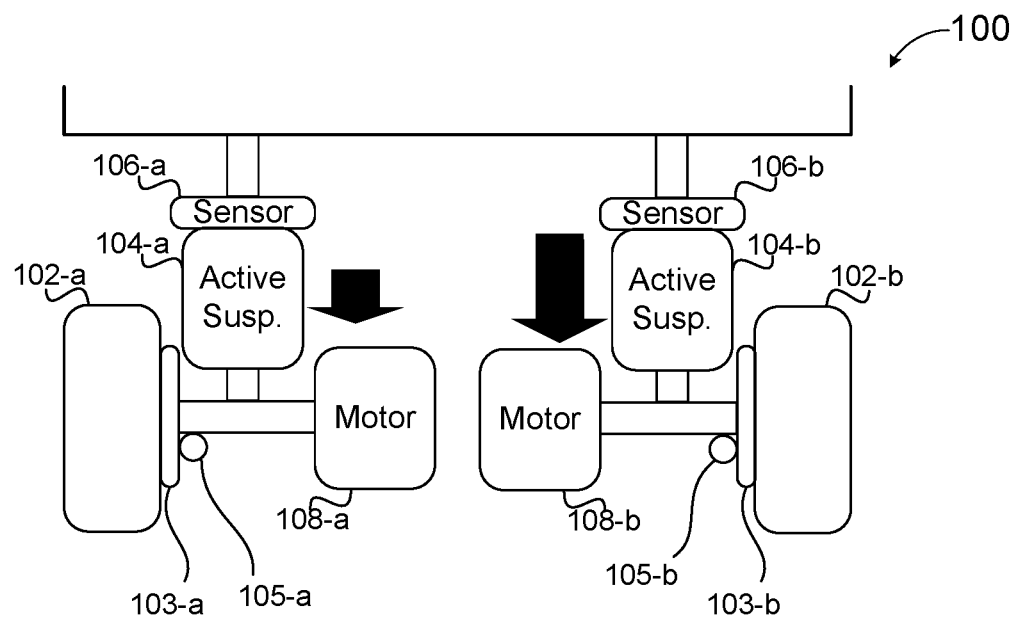

FIGS. 2A and 2B illustrate an example of a downward force being reduced from the front left tire 102-*a* and being distributed to the front right tire 102-*b* of the vehicle 100. In FIGS. 2A and 2B, the black arrows represent downward forces being applied to each respective tire 102. In FIG. 2A, the downward force 202-*a* being applied to the front left tire 102-*a* is roughly equal to the downward force 202-*b* being applied to the front right tire 102-*b*. The front left tire 102-*a* and the front right tire 102-*b* may be front or rear tires of a four-wheeled vehicle, and forces may be applied to the other tires (not shown in FIGS. 2A-2B) according to a weight distribution for the vehicle. In some vehicles, weight is distributed according to a 50/50 ratio, where 50% of the vehicle's weight is supported by the rear wheels, and 50% of the vehicle's weight is supported by the front wheels. Other vehicles may have different distributions, such as 60/40, where 60% of the vehicle's weight is distributed to the front wheels, while 40% of the vehicle's weight is distributed to the rear wheels. In either scenario, the weight of the vehicle is typically distributed 50/50 laterally (i.e., from the left side to the right side).

Figure 3A:
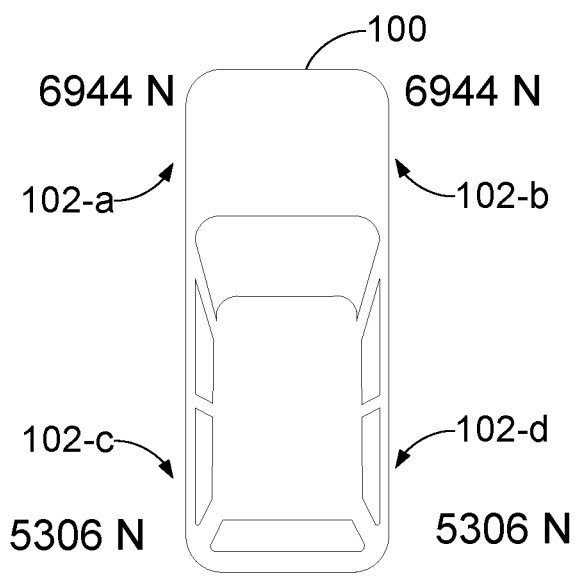
FIGS. 3A and 3B are schematics that illustrate an example of a downward force being redistributed from a first tire to the other tires of the vehicle.
Figure 3B:
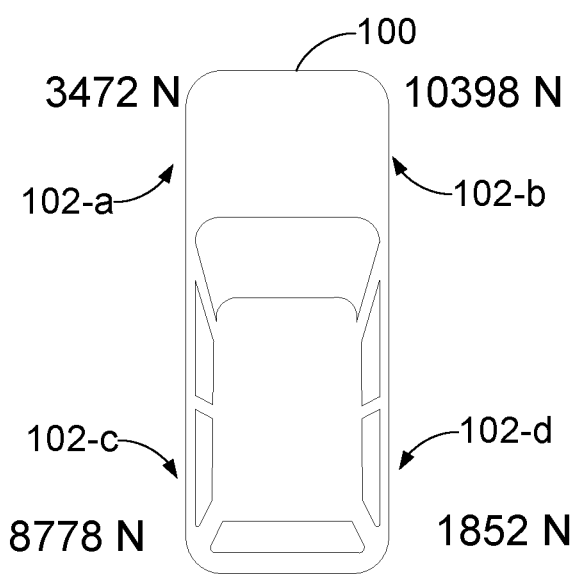

In FIG. 2B, the active suspension components 104 have been controlled to reduce the force applied to the front left tire 102-*a*, such as by selectively extending or retracting linear actuators that are associated with the active suspension components 104. As a result, the amount of force applied to the front right tire 102-*b* increases. The amount of force applied to other tires FIGS. 3A and 3B illustrate an example of the downward force being redistributed from the front left tire 102-*a* to the other tires 102-*b*, 102-*c*, 102-*d* of the vehicle 100. In the example of FIGS. 3A and 3B, the vehicle 100 has a width to length ratio of 1:2, a total weight of 24500 N (mass=2500 kg). As shown in FIG. 3A, assuming that the center of gravity of the vehicle 100 is located 43.3% from the front axle and 56.7% from the rear axle, the total downward force is 24500 N distributed across the four tires 102 of the vehicle 100 with the front left tire 102-*a* and the front right tire 102-*b* each carrying 6944 N, and the rear left tire 102-*c* and the rear right tire 102-*d* each carrying 5306 N. In FIG. 3B, however, the 24500 N force has been redistributed such that half of the force nominally carried by the front left tire 102-*a* is redistributed to the other three tires such that the front left tire 102-*a* carries 3472 N, the front right tire 102-*b* carries 10398 N, the rear left tire 102-*c* carries 8778 N, and the rear right tire 102-*d* carries 1852 N. Upon redistributing the downward force, the friction determination unit 116 may estimate the friction parameter.

Referring back to FIG. 1B, the friction determination unit 116 can change the traction force that is applied by the tire 102 having reduced downward force (e.g., the front left tire 102-*a* from FIGS. 2B and 3B), for example, by instructing the torque control unit 114 to modulate the torque being applied to the tire 102 or by instructing the steering control unit 115 to modulate the steering angle of the tire 102. As one example, the friction determination unit 116 can instruct the torque control unit 114 to increase the torque in order to target certain slip ratio values. As another example, the friction determination unit 116 can instruct the steering control unit 115 to increase the steering angle in order to target certain slip angle values. In some implementations, the friction determination unit 116 samples the traction force at the tire/surface interface as it increases (or decreases) the slip ratio and/or the slip angle to determine the maximum available traction force.

Figure 4:
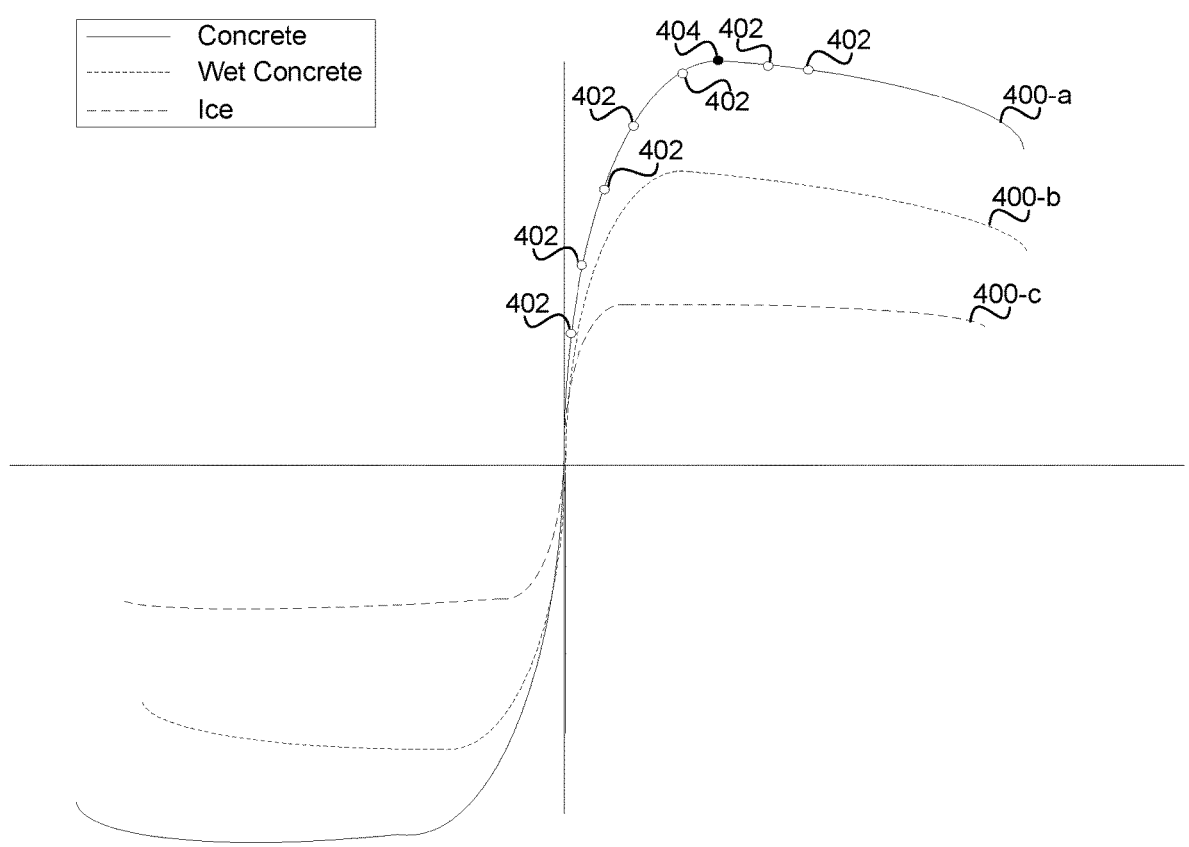
FIG. 4 is a graph illustrating different slip ratio curves.

FIG. 4 illustrates an example of three slip ratio curves 400-a, 400-b, 400-c. In the illustrated example, the x-axis represents the slip ratio of a tire at a surface and the y-axis represents the tractive force of the tire 102 at the surface. The first slip ratio curve 400-a illustrates the relationship between the slip ratio and the tractive force on dry concrete with a substantially constant downward force being applied to the tire 102. The second slip ratio curve 400-b illustrates the relationship between slip ratio and the tractive force on wet concrete with a substantially constant downward force being applied to the tire 102. The third slip ratio curve 400-c illustrates the relationship between slip ratio and the tractive force on ice with a substantially constant downward force being applied to the tire 102. As shown in the three curves, when the slip ratio is zero, the traction force is also zero. As the slip ratio increases, the traction force also increases until the traction force reaches the maximum available traction force. Once the maximum available traction force is reached, the traction force will decrease as the slip ratio increases. As also shown in FIG. 4, as the friction of a surface decreases (assuming the friction coefficient of ice is less than that of dry concrete or wet concrete), so too does the maximum available traction force. In the illustrated example, the maximum available traction force on concrete is much greater than the maximum available force on wet concrete or ice.

Although not illustrated in FIG. 4, a similar relationship exists between the maximum available traction force and slip angles. In a similar manner, the available traction force and slip angle increase until a peak traction force is reached. After the peak value is reached, the available traction force decreases as the slip angle increases.

The friction determination unit 116 can sample the traction force at various slip ratios and/or slip angles until the maximum available traction force is determined. In the illustrated example of FIG. 4, the friction determination unit 116 determines (e.g., measures or estimates) the traction force at various points (shown as circles 402 on the concrete slip ratio curve 400-a) that correspond to slip ratio values. The friction determination unit 116 can continue to determine (e.g., measure or estimate) the slip ratio until it detects that the slip ratio begins to decrease. In the example of FIG. 4, the black circle 404 represents the maximum available traction force. The same type of process can be applied to slip angle determination.

Figure 5:
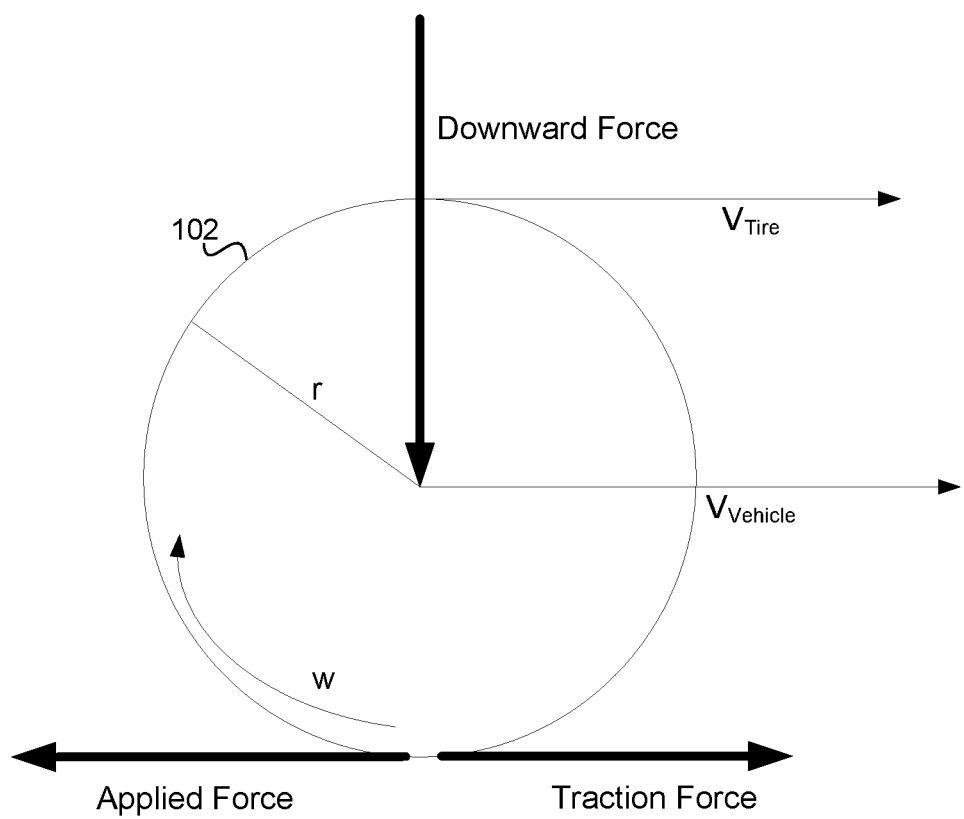
FIG. 5 is a schematic illustrating example of the various measurements, velocities, and forces that may be sampled to determine a slip ratio and a maximum available traction force.

FIG. 5 illustrates an example of the various measurements, velocities, and forces that may be sampled to determine the slip ratio and the maximum available traction force. In FIG. 5, a tire 102 is turned in a clockwise manner about the axle of the tire 102. The tire has an effective radius. The effective radius is determined according to Equation 2 in the absence of any traction force (i.e., when the tire 102 is free rolling):

$$r = \frac{D}{2\pi N} \quad (2)$$

where r is the effective radius, D is that distance that the vehicle 100 traveled, and N is the number of complete revolutions of the tire 102 over the distance D. The tire turns at an angular velocity w (measured in radians). The product of the effective radius and the angular velocity is the translational velocity of the tire 102, $V_{Tire}$. Compression/expansion of the tire 102 causes the slip ratio, and because of wheel slip, the translational velocity of the tire 102 does not match the translational velocity of the vehicle 100, $V_{Vehicle}$. When a torque is applied to the tire, it applies a force along the surface (the applied force). The friction between the tire 102 and the surface (e.g., road) is what causes the tire 102 to move forward. The resultant force from the friction at the tire surface interface is the traction force. The downward force is the force that is transferred to the tire 102 via the active suspension component 104 from the chassis of the vehicle 100. The downward force may be measured by a weight sensor 106 or otherwise measured or estimated.

Referring back to FIG. 1B, the friction determination unit 116 (or another suitable unit) can determine the slip ratio at a given time in any suitable manner. In some implementations, the friction determination unit 116 determines the slip ratio based on the rotational speed of the tire and the velocity of the vehicle. In some implementations, the friction determination unit 116 determines the slip ratio according to:

$$\text{Slip Ratio} = 1 - \frac{w * r}{V_{Vehicle}} \quad (3)$$

where w is the angular velocity of the tire 102, r is the effective radius of the tire, and $V_{Vehicle}$ is the translational velocity of the vehicle. The angular velocity of the tire 102 may be obtained from a wheel speed sensor and/or derived from a motor speed that is obtained from a motor speed sensor. The translational velocity of the vehicle 100 may be determined (e.g., by measurement or estimation), as examples, by sensors associated with the wheels or a satellite navigation system. Other components may be used to determine the translational velocity of the vehicle 100.

The friction determination unit 116 can issue commands to the torque control unit 114 and/or the steering control unit 115 to adjust the torque and/or steering angle to adjust the slip ratio and/or slip angle. As the torque and/or steering angle is adjusted, the friction determination unit 116 can monitor vehicle states to measure or estimate the downward force Fz, the longitudinal traction force Fx, the lateral traction force Fy, the slip ratio and/or the slip angle.

The longitudinal traction force Fx can be measured or estimated. As one example, the friction determination unit 116 can measure the longitudinal traction force Fx using a torque sensor at the tire 102 or motor 108 that is turning the wheel. As another example, imaging techniques can be used to the longitudinal traction force Fx based on tire deformation by analysis of images that show the tires 102. As another example, the longitudinal traction force can be estimated based on the rotational inertia of the wheel, the angular acceleration of the wheel, the applied drive torque, and the effective radius of the wheel. As examples, in the case of a wheel, the rotational inertia of the wheel may be precomputed through simple measurements, the effective radius of the wheel may be determined or approximated based tire specifications, the angular acceleration of the tire can be determined by measuring the angular speed and taking its derivative, and the applied drive torque can estimated using known techniques (e.g., electrical current draw). Other known techniques may be used. Using these values, the longitudinal traction force Fx can be estimated according to Equation 4. In this implementation, rolling resistance and other minor factors are omitted.

$$\text{Rot'l\_Inertia} * \text{Angular\_accel} = \text{Drive\_Torque} - \text{effective\_radius} * Fy \quad (4)$$

The lateral traction force Fy can be measured or estimated. Actuating the tire 102 by changing its steering angle changes the slip angle of the tire 102 and changes the lateral traction force Fy that is generated by the tire if it is in contact with the ground. The lateral traction force Fy is dependent on the steering angle of the tire 102, the heading direction of the body of the vehicle 100, the downward force Fz on the tire 102, tire characteristics (e.g., including material properties that affect tire dynamics), and the friction coefficient itself.

In some situations, the lateral traction force Fy on the sensing tire may be measured or estimated while making a turn and concurrently estimating friction. In some situations, the lateral traction force Fy on the sensing tire may be measured in order to allow active control of slip angles to achieve various target slip angles. Alternatively, measurement of the lateral traction force could be avoided by actively steering the sensing tire so that it has a zero degree slip angle and thereby produces zero lateral force.

As one example, the lateral traction force can be measured using force sensors that are connected to lateral force bearing structures. In some implementations, the friction determination unit 116 can measure the lateral traction force Fy using a force transducer associated with a component connected to the tire 102, such as a tie rod. As another example, imaging techniques can be used to estimate the lateral traction force Fy based on tire deformation by analysis of images that show the tires 102. Other known methods exist and can be used to estimate the lateral traction force Fy.

The friction determination unit 116 can continue to sample the slip ratio, the slip angle, and the traction forces until the friction determination unit 116 determines that sufficient information has been collected for friction estimation, such as when the maximum available traction force has been realized. As shown in the curves of FIG. 4, at a certain slip ratio, the traction force will begin to decrease as the slip ratio increases. The traction force determined at or near this point can be considered the maximum available traction force. In some implementations, the friction determination unit 116 utilizes the maximum available traction force to determine the coefficient of friction or other related parameters for the tire/surface interface.

A number of methods can be used to determine (e.g., by estimation) the maximum available traction force. As one example, the friction determination unit 116 can target a variety of slip ratios and/or slip angles and compute or measure the corresponding longitudinal traction force Fx and the corresponding lateral traction force Fy. These measurements are continued until a sufficient number of measurements have been obtained to allow construction of a curve (i.e., a force versus slip curve) that shows the peak traction force that is generated. This data can be interpreted to estimate the peak traction force. As another example, the friction determination unit 116 can target a variety of slip ratios or slip angles and compute or measure the corresponding longitudinal traction force Fx and the corresponding lateral traction force Fy. These measurements are continued until the slip ratio or slip angle exceeds value at which the peak force is generated, although none of the measurements necessarily corresponds to the slip ratio or slip angle at which the peak force is generated. This data is processed to estimate the peak force (e.g., by interpolation). As another example, measurements are not gathered until the peak force is reached, but instead, stop at slip ratio values or slip angle values that are lower than those at which the peak traction force is generated. The highest traction force values that are measured during this process can be adopted as estimates of the peak traction force, which provides a basis for a conservative friction estimate. Force estimates or measurements versus the longitudinal slip ratio and/or the slip angle may be carried out to generate the friction circle, friction ellipse or other form taken by the friction boundary suggested by the tire characteristics suggest that links the friction parameter (i.e., isotropic or non-isotropic friction parameter) that relates the downward force Fz to the traction force.

The peak value refers to the peak of a relationship (which can be plotted as a curve) between the traction force and a tire dynamic response, such as the longitudinal slip ratio or the slip angle. If both slip angle and slip ratio are being varied as data is being collected, a three-dimensional relationship can be established and represented as a three-dimensional plot, with the two horizontal axes representing the longitudinal slip ratio and slip angle, respectively, and the vertical axis being the traction force (i.e., sqrt(Fx^2+ Fy^2)).

In some scenarios, the downward force Fz may be varying. For example, the downward force Fz may be reduced relative to a nominal value, but it fluctuates within a range instead of maintaining a constant value. In this situation, then the peak value is simply the friction peak. In such the traction force normalized by the downward force (i.e., sqrt(Fx^2+Fy^2)/Fz) is compared to the longitudinal slip value and/or to the slip angle, and the peak of this relationship is used as a basis for estimating the friction coefficient.

The friction determination unit 116 can determine the coefficient of friction based on the maximum available traction force and the downward force being applied to the tire 102. In some implementations, the friction determination unit 116 determines the coefficient of friction of the tire/surface interface according to:

$$\mu = \frac{F_{MAX}}{F_{Downward}} \quad (5)$$

where $F_{MAX}$ is the maximum available traction force and $F_{Downward}$ is the downward force applied to the tire 102. Due to the empirical nature of determining the maximum available traction force, the coefficient of friction may be an estimated coefficient of friction. By reducing the downward force applied to one of the tires, the maximum available traction force is also reduced. Thus, when determining the friction parameter in the manner proposed above, there is less disturbance to the passengers in the vehicle, and less wear on the tires 102.

Upon determining the friction parameter (e.g., maximum available traction force and/or coefficient of friction), the friction determination unit 116 can output the friction parameter to the vehicle control unit 118. The vehicle control unit 118 may utilize the friction parameter for a number of different operations. For instance, if the vehicle 100 is an autonomous vehicle, the vehicle control unit 118 may utilize the friction parameter when determining how fast to accelerate or how fast to enter a turn. In some implementations, the vehicle control unit 118 may issue a notification to a driver or passenger if the coefficient of friction is below a threshold.

Furthermore, in some implementations, the vehicle control unit 118 is configured to adjust for a moment created by the redistribution of downward forces that are applied to the tires 102. For example, if the friction determination unit 116 samples the slip ratio at the front left tire 102-a, the reduction of downward force from the front left tire 102-a may create a moment about the z-axis of the vehicle 100. If in this example, the vehicle 100 is driving in a straight line, the moment generated on the vehicle 100 about its z-axis would be counterclockwise due to a reduced downward force on the front left tire 102-a. To counteract the moment, the vehicle control unit 118 can actuate one or more of the tires 102 of the vehicle 100 to induce a counter-moment the opposite way either by counter steering the other tires or may apply the braking component 104-d to the rear right tire 102-d to counteract the moment.

In some implementations, the vehicle control unit 118 may counteract the moment by counter steering one or more tires 102 individually. In this way, the vehicle 100 may continue to operate without disturbing the experience of the passengers in the vehicle 100. For example, if downward force applied to the front right tire of the vehicle 100 is reduced while the vehicle 100 is turning, the amount of lateral force applied by the tire to the surface is also reduced. This is because the lateral force generated by the tire is partially dependent on the lateral slip angle, or the angle between the velocity vector of the tire and the direction towards which the tire is pointing, and the downward force applied to the tire. Due to the reduction in lateral force, a moment is created about a vehicle z-axis (an axis extending through the vehicle vertically from the lateral surface) that negatively affects steering of the vehicle 100. To compensate for this effect, other tires may be turned, or counter steered, independently. For example, the front left tire may be counter steered independently of the front right tire.

As an example of the foregoing, consider a situation in which the vehicle 100 is attempting to make a left turn and one or more tires are being turned to generate a lateral force to execute the turn. In this situation, the downward force on the front left tire 102-a will be modulated to help compute the friction coefficient.

Scenarios in which the vehicle 100 is turning differ from straight-line driving scenarios in that the lateral force Fy on the tire is zero during straight line driving. During turning, however, a slip angle that is generating a lateral force. The slip angle is defined as:

$$\text{alpha} = \text{heading}_{angle} - \text{delta} \tag{6}$$

The heading angle is defined as:

$$\text{heading\_angle} = \arctan(vy/vx) \tag{7}$$

In the foregoing equations, vy is the lateral velocity of the front left tire 102-a in the body frame of the vehicle 100, vx is the longitudinal velocity of the front left tire 102-a in the body frame of the vehicle 100, and delta is the steering angle of the front left tire 102-a in the body frame of the vehicle 100.

When a tire is generating both lateral and longitudinal forces (because it is turning), the force equation in the plane of the tire-road interface is approximated by:

$$(Fx)^2 + (Fy)^2 = mu^2 * (Fz)^2 \tag{8}$$

In the foregoing equation, Fx is the longitudinal traction force on the tire, Fy is the lateral tire force, Fz is the downward force of the tire, and mu is the tire-road interface friction coefficient at the time and place of measurement.

In straight-line examples, mu was estimated by controlling to find the top of the Fx vs slip ratio curve. During turning, a similar result can be achieved by tracking the slip angle alpha (e.g., according to the equation given above) and actively steering the front left tire 102-a to make alpha equal to zero for the front left tire 102-a. This will allow the lateral force generated from the front left tire Fy to be zero and turn our force equation on the front left tire to be:

$$(Fx)^2 + (0)^2 = mu^2 * (Fz)^2 \tag{9}$$

or $$Fx = mu * Fz \tag{10}$$

In this way, the previously-described methods can be applied, including modulating the downward force on the front left tire to sample the Fx versus slip ratio curve at different points to collect information about the peak force to estimate mu while the front left tire is now being actively steered so that it produces zero lateral force Fy.

Because friction is being measured during a turn, the lateral traction force that was being utilized for turning may be reduced (even though the other tires now have a larger downward force, due to non-linearity in the force versus slip equation, the generated lateral force Fy per tire may not add up to the same number when compared to turning when a friction measurement is not occurring). Various types of compensation may be applied to address this. As one example, during a left turn, the front-right tire 102-b may be steered further the left and a further lateral slip angle may be generated, thereby generating further lateral traction force. As another example, one or more of the rear wheels could be steered in the correct direction to generate a further lateral slip angle, thereby generating a further lateral traction force. As another example, a braking torque could be applied to the rear left tire 102-c to generate a turning moment about the z-axis of the vehicle 100.

Figure 6:
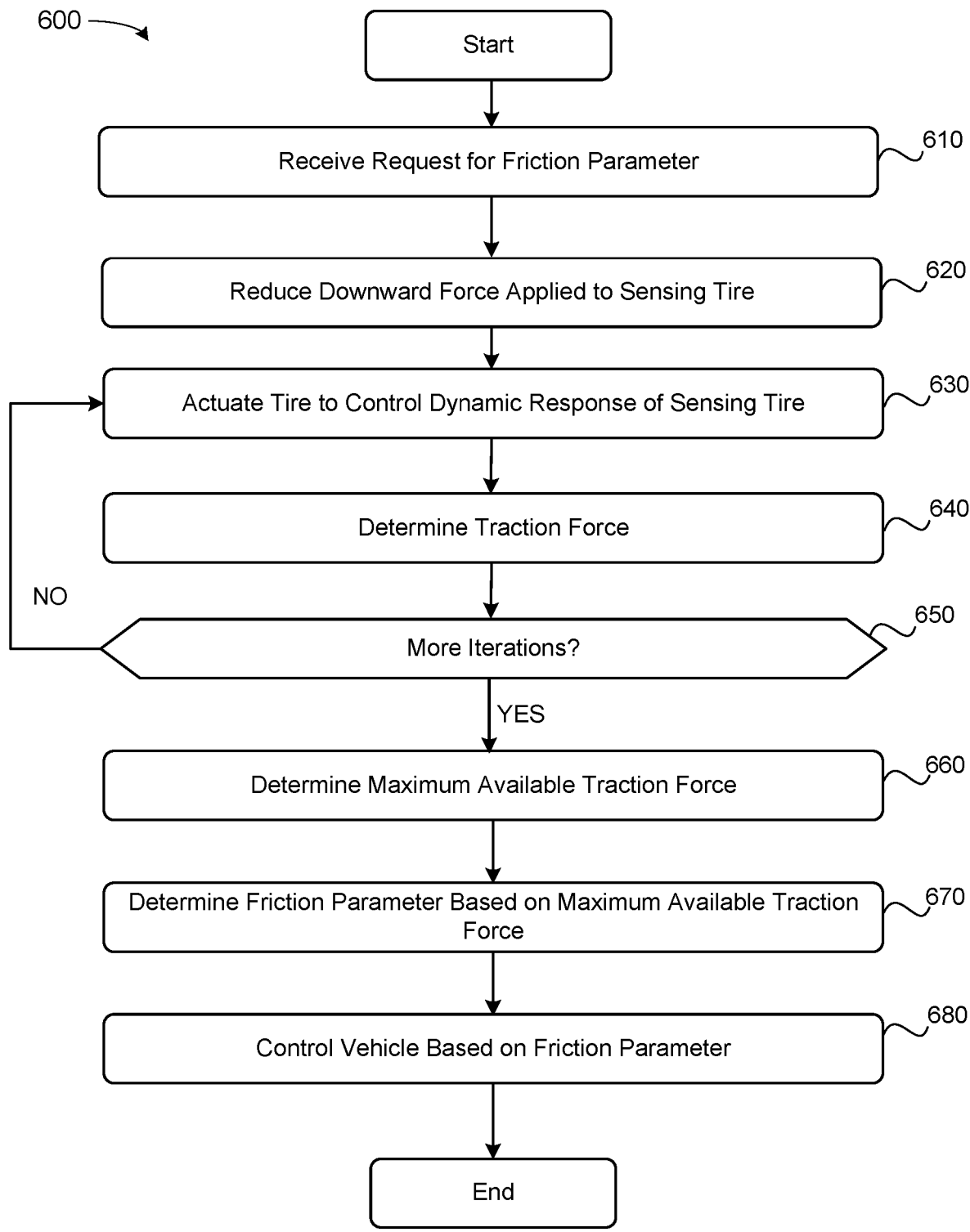
FIG. 6 is a flow chart that shows a process for determining a friction parameter of at a tire/surface interface according to a first example.

FIG. 6 is a process 600 for determining a friction parameter at a tire/surface interface according to a first example. The process 600 is described with respect to the components of FIGS. 1A and 1B. For instance, the operations of the process 600 can be performed by, or caused to be performed by, the controller 110, inclusive of the suspension control unit 112, the torque control unit 114, the friction determination unit 116, and the vehicle control unit 118. The process 600 may, however, be executed by any suitable components. In some implementations, the process 600 is performed in whole or in part by, or under the direction of, a computing device (e.g., including a processor and a memory module) that implements the process 600 by executing computer program instructions.

Initially, the vehicle 100 is moving under its own power, such as by applying torque to one or more tires from a set of tires, such as the tires 102, to cause the vehicle 100 to move along a surface.

In operation 610, the friction determination unit 116 receives a request for a friction parameter. The request may be received from the vehicle control unit 118. In some implementations, the request may be part of the program instructions that are executed by the friction determination unit 116. As one example, the request may be made at fixed time intervals. As another example, the request may be made when certain operating conditions of the vehicle 100 are met, such as when one or more parameters fall in designated ranges. As examples, the parameters may be or include velocity, acceleration, and/or steering angles.

Operation 620 includes reducing an amount of the downward force Fz applied to the surface by a first tire from the tires 102 of the vehicle using the active suspension component 104. This tire is referred to in the description of the process 700 as a sensing tire. The downward force Fz applied to the sensing tire is reduced in order to reduce the maximum traction force that can be achieved by the sensing tire in order to facilitate friction estimation. In some implementations, the friction determination unit 116 commands the suspension control unit 112 to reduce the downward force on the sensing tire. In response, the suspension control unit 112 actuates the active suspension component 104 of the vehicle 100. As an example, the active suspension component 104 may include a linear actuator that contracts to apply an upward force on the sensing tire. In this way, the downward force Fz on the sensing tire is reduced. In reducing the downward force applied to the sensing tire, the downward force that is removed from the sensing tire is distributed to the other tires 102 of the vehicle 100. As previously discussed, by reducing the downward force Fz that is applied to the sensing tire, the maximum traction forces that can be applied by the sensing tire are reduced, including the longitudinal traction force Fx and the lateral traction force Fy.

In operation 630, subsequent to reducing the amount of downward force applied to the surface by the sensing tire, the sensing tire is actuated to control a dynamic response of the sensing tire relative to the surface, which results in a change in a traction force that is applied to the surface by the sensing tire. Actuating the sensing tire can be performed by actuating any degree of freedom with respect to which the sensing tire is able to be actuated. As one example, actuating the sensing tire can be performed by applying propulsion torque to the sensing tire using one of the motors 108 in order to change the magnitude of the longitudinal traction force Fx that is applied to the surface by the sensing tire. As another example, actuating the sensing tire can be performed by applying braking torque to the sensing tire by applying braking torque to the sensing tire using one of the braking components 103 in order to change the magnitude of the longitudinal traction force Fx that is applied to the surface by the sensing tire. As another example, actuating the sensing tire can be performed by steering the sensing tire by using one of the steering components 105 in order to change the magnitude of the lateral traction force Fy that is applied to the surface by the sensing tire.

The actuation applied to the sensing tire in operation 630 can be modulated to achieve a target longitudinal slip ratio and/or a target slip angle. In some implementations of the method 600, the lateral traction force Fy can be held at a constant value (e.g., at approximately zero or at any non-zero value) while the longitudinal traction force Fx is changed by actuating the sensing tire (e.g., by propulsion torque or braking torque) to achieve a target longitudinal slip ratio. In some implementations of the method 600, the longitudinal traction force Fx can be held at a constant value (e.g., at approximately zero or at any non-zero value) while the lateral traction force Fy is changed by actuating the sensing tire (e.g., by steering) to achieve a target lateral slip angle.

Operation 640 is performed while actuating the sensing tire and includes determining a traction force of the sensing tire relative to the surface. Multiple iterations of operation 630 and operation 640 are performed. In each iteration, operation 630 changes the slip ratio or slip angle of the sensing tire relative to the surface, which changes one or both of the longitudinal traction force Fx and the lateral traction force Fy, and operation 640 determines (e.g., measures or estimates) the traction force of the sensing tire that corresponds to the value of the slip ratio or slip angle that was set at operation 630.

In one example, operation 630 may include actuating the sensing tire to change the longitudinal slip ratio applied to the surface by changing an amount of propulsion torque applied to the sensing tire, and the resulting change in the longitudinal traction force is determined (e.g., by measurement or estimation) in operation 640. In another example, operation 630 may actuating the sensing tire to change the longitudinal slip ratio applied to the surface by changing an amount of braking torque applied to the sensing tire, and the resulting change in the longitudinal traction force is determined in operation 640. In either of these examples, actuating the sensing tire to change the longitudinal slip ratio applied to the surface by the sensing tire may include steering the sensing tire to maintain the lateral traction force Fy equal to approximately zero while changing the longitudinal traction force by propulsion or braking as previously described. Maintaining the lateral traction force Fy equal to approximately zero allows friction to be estimated as a function only of the longitudinal slip ratio, without simultaneously considering the impact of slip angle on the maximum available traction force.

In some implementations, the torque applied to the sensing tire is modulated over multiple iterations of operation 630 and operation 640. Modulating the torque may include increasing the torque to achieve a greater positive slip ratio or decreasing the torque to achieve a lesser negative slip ratio. Thus, for example, modulating a first torque value can include increasing the first torque value until a determined slip ratio corresponding to the sensing tire reaches the target slip ratio. In some scenarios, the torque applied to the sensing tire is gradually increased to increase the slip ratio.

In some implementations, the steering angle of the sensing tire is modulated over multiple iterations of operation 630 and operation 640. Modulating the steering angle may include increasing the steering angle in first or second directions (i.e., left and right) to achieve larger magnitudes for the slip angle. Thus, for example modulating a steering angle value can include increasing the steering angle value until a determined slip angle corresponding to the sensing tire reaches the target slip angle. In some scenarios, the steering angle applied to the sensing tire is gradually increased to increase the slip angle.

During actuation of the sensing tire, the longitudinal traction force Fx, the lateral traction force Fy, the longitudinal slip ratio, and/or the slip angle are changing, and the friction determination unit 116 may determine these values (e.g., by measurement or estimation) to collect data that defines a relationship between specific values for the traction forces relative to values of the longitudinal slip ratio and/or slip angle.

As one example, the torque control unit 114 may apply torque to the sensing tire to adjust the slip ratio between a first slip ratio value and a second slip ratio value where the second slip ratio is less than the first slip ratio. As another example, the torque control unit 114 may apply torque to the sensing tire to adjust the slip ratio between a first slip ratio value and a second slip ratio value where the second slip ratio is more than the first slip ratio. As another example, the torque control unit 114 may apply torque to the sensing tire to adjust the slip ratio between a first slip ratio and a second slip ratio and determine the change between the first slip ratio and the second slip ratio. As another example, the torque control unit 114 may apply torque to the sensing tire to adjust the slip ratio between multiple slip ratios where each of the multiple slip ratios is unique. As another example, the torque control unit 114 may apply torque to the sensing tire to adjust the slip ratio in any suitable manner or combination thereof. In some scenarios, the torque control unit 114 may adjust by the slip ratio by iteratively increasing the slip ratio. The slip ratio may be determined as described previously, or in any other suitable manner.

As one example, the steering control unit 115 may change the steering angle of the sensing tire to adjust the slip angle between a first slip angle value and a second slip angle value where the second slip angle is less than the first slip angle. As another example, the steering control unit 115 may change the steering angle of the sensing tire to adjust the slip angle between a first slip angle value and a second slip angle value where the second slip angle is more than the first slip angle. As another example, the steering control unit 115 may change the steering angle of the sensing tire to adjust the slip angle between a first slip angle and a second slip angle and determine the change between the first slip angle and the second slip angle. As another example, the steering control unit 115 may change the steering angle of the sensing tire to adjust the slip angle between multiple slip angles where each of the multiple slip angles is unique. As another example, the steering control unit 115 may change the steering angle of the sensing tire to adjust the slip angle in any suitable manner or combination thereof. In some scenarios, the steering control unit 115 may adjust by the slip angle by iteratively increasing the slip angle. The slip angle may be determined as described previously, or in any other suitable manner.

In operation 650, the friction determination unit 116 determines whether to perform additional iterations of operation 630 and operation 640 to collect more data that correlates values for the longitudinal traction force Fx and/or the lateral traction force Fy to the longitudinal slip ratio and/or the slip angle prior to friction estimation. If addition iterations will be performed prior to friction estimation, the process 600 returns to operation 630. If additional iterations will not be performed, the process 600 continues to operation 660.

As one example, the friction determination unit 116 can perform additional iterations of operation 630 and operation 640 until a predetermined condition is reached. As one example, the predetermined condition can be collection of a specified number of data points. As another example, the predetermined condition can be passage of a predetermined time period. As another example, the predetermined condition can be reaching a threshold value for one or more of the longitudinal traction force Fx, the lateral traction force Fy, the longitudinal slip ratio, and/or the slip angle.

As another example, the predetermined condition can correspond to a determination that a maximum available traction force has been reached. In one implementation, as the slip ratio increases, the traction force at the tire/surface interface initially increases. During the gradual increase of the slip ratio, the friction determination unit 116 may sample the traction force at various slip ratio levels. Eventually, as the slip ratio increases, the resultant traction force will reach the maximum available traction force, and then begin to decline. At the point (or near the point) where the traction force begins declining, the friction determination unit 116 can identify the maximum available traction force. In other implementations, the friction determination unit 116 may determine that the maximum available traction force has been reached by processing the tire dynamic responses, including measured slip ratios and measured slip angles, and corresponding traction forces.

It should be understood that operations 630 and 640 can be performed on a continual basis, and the friction estimate may be updated periodically while actuation of the sensing tire and measurement continue. For example, newly measured values for the longitudinal traction force Fx and/or the lateral traction force Fy relative to the longitudinal slip ratio and/or the slip angle can be passed on for use in friction estimation while measurements continue.

In operation 660 the maximum available traction force is determined based on the dynamic responses and corresponding values for the traction force that were determined in the previously-performed iterations of operation 630 and operation 640. As one example, the highest measured longitudinal traction force Fx, the highest measured lateral traction force Fy, or the highest measured traction force can be utilized as an estimate of the maximum available traction force. As another example, the traction forces, slip ratios, and/or slip angles can be utilized to estimate the maximum available traction force, force example, by determining that the peak of a force versus slip curve defined by the determined values lies between two of the determined values, and estimating the peak value based on the slope of the curve on either side of the peak location. As another example, the peak traction force may be estimated using a peak finding algorithm, by curve fitting using a high order polynomial, by interpolation, or by other suitable methods.

In operation 670, the friction parameter is determined based on the maximum available traction force. In some implementations, the friction parameter is the maximum available traction force at the tire/surface interface. In other implementations, the friction parameter is the coefficient of friction at the tire/surface interface.

As an example, the friction determination unit 116 can calculate the coefficient of friction based on the maximum available traction force and the downward force that is applied to the tire 102. As one example, the coefficient of friction can be estimated based on the relationship presented in Equation 1. Other known methods for estimating the coefficient of friction (or other friction parameters) based on estimates or measurements of traction forces, slip ratios, and/or slip angles can be used. As one example, another known method for estimating the coefficient of friction uses pneumatic trail measurement for friction estimation.

Upon determining the friction parameter, the friction determination unit 116 may output the friction parameter to the vehicle control unit 118. At operation 680, the vehicle 100 may be controlled based on the friction parameter. In some implementations, the vehicle control unit 118 may control the operation or trajectory of the vehicle based on the friction parameter.

As one example, if a determined coefficient of friction is below a threshold, the vehicle control unit 118 may activate a slip control system that is included in the vehicle 100. Additionally or alternatively, the vehicle control unit 118 may slowly decease the speed of the vehicle 100. If the vehicle is approaching a turn, the vehicle control unit 118 may utilize the determined coefficient of friction to determine the velocity at which the turn may be taken at. The vehicle control unit 118 may utilize the friction parameter for any other suitable purposes. If the vehicle 100 is under autonomous control, the friction parameter may be used to determine trajectories and speeds, which may then be followed by outputting commands to actuator systems to cause the vehicle 100 to move according to the determined trajectories and speeds. If the vehicle 100 is being operated by a human operator and the friction parameter is below a threshold, the vehicle control unit 118 may issue a warning notification to the driver.

The process 600 may be applied to a number of different control and sensing scenarios.

As one example, the process 600 may be applied to a straight line driving scenario in which a varying amount of controlled reduced downward force Fz is applied to the sensing wheel, a varying controlled amount of longitudinal slip is applied at the reduced downward force Fz. Traction force estimates or measurements for the longitudinal traction force Fx are collected for multiple values of longitudinal slip ratios, and the peak longitudinal traction force is estimated from these values. The coefficient of friction may then be estimated according to Equation 1. Other tires of the vehicle 100 may be controlled by brake blending, torque actuation, counter steering, or a combination of these control strategies to counteract any disturbance caused by actuation of the sensing wheel, as will be discussed further herein.

As another example, the process 600 may be applied to a scenario in which torque applied to the sensing wheel is actively controlled to produce no longitudinal traction forces (i.e., the longitudinal traction for is approximately equal to zero). Instead, the sensing wheel is actuated by actively steering the sensing wheel to generate and determined varying slip angles and to generate and determine corresponding lateral forces. The lateral forces are estimated, computed, or measured (e.g., using a sensor such as a force transducer connected to a tie rod). Other suitable sensors or estimation methods can be used. Traction force estimates or measurements for the lateral traction force Fy are collected for multiple values of slip angles, and the peak lateral traction force is estimated from these values. The coefficient of friction may then be estimated according to Equation 1 with Fx set equal to zero or using estimated or measured values in case of significant deviations from zero. Other tires of the vehicle 100 may be controlled by brake blending, torque actuation, counter steering, or a combination of these control strategies to counteract any disturbance caused by actuation of the sensing wheel, as will be discussed further herein.

As another example, the process 600 may be applied to a scenario in which the vehicle 100 is turning and the sensing wheel is actively steered to approximately produce zero lateral traction force Fy. A varying amount of controlled reduced downward force Fz is applied to the sensing wheel, and a varying controlled amount of longitudinal slip is applied at the reduced downward force Fz. Traction force estimates or measurements for the longitudinal traction force Fx are collected for multiple values of longitudinal slip ratios, and the peak longitudinal traction force is estimated from these values. The coefficient of friction may then be estimated according to Equation 1, with the lateral traction force Fy set equal to zero or using estimated or measured values for the lateral traction force Fy in case of significant deviations from zero. Other tires of the vehicle 100 may be controlled by brake blending, torque actuation, counter steering, or a combination of these control strategies to counteract any disturbance caused by actuation of the sensing wheel, as will be discussed further herein.

As another example, the process 600 may be applied to a scenario in which the vehicle 100 is executing a turn and a varying controlled amount of reduced downward force Fz is applied to the sensing wheel. Varying controlled amounts of longitudinal slip are applied, such as by actuation using propulsion torque and/or braking torque, to generate longitudinal forces and/or varying controlled amounts of slip angle are applied, such as by actuation by changing the steering angle of the sensing wheel, to generate respective lateral forces. For example, both slip angle and slip ratio can be increased linearly. These forces are measured, computed, or estimated using sensors or any suitable method. The coefficient of friction may then be estimated according to Equation 1. Other tires of the vehicle 100 may be controlled by brake blending, torque actuation, counter steering, or a combination of these control strategies to counteract any disturbance caused by actuation of the sensing wheel, as will be discussed further herein.

In the implementations described previously, traction forces are estimated or measured as a function of targeted longitudinal slip ratios and/or slip angles, and the estimated or measured or computed traction forces are used to estimate a peak traction force while the downward force on the sensing wheel (or wheels) is reduced. However, this technique can also be applied in implementations in which traction forces are estimated or measured while varying the downward force Fz and targeting a variety of slip ratios and/or slip angles. In such an implementation, the measured or estimated traction values can be normalized based on the downward force Fz at which they were measured or estimated. Thus, for example, a ratio Fx/Fz of the longitudinal traction force Fx relative to the downward force Fz can be compared to the longitudinal slip ratio as a basis for estimating friction.

In some implementations, instead of estimating friction as a function of traction force versus the slip ratio or the slip angle, a multi-dimensional relationship can be established by which the peak traction force can be determined as a joint function of the slip ratio and the slip angle.

It should further be understood that other friction estimation methods, in addition to those based on slip ratios and slip angles, could be utilized in the context of the techniques described herein. Generally, after reducing the downward force Fz that is applied to the sensing wheel, any manner of perturbation could be applied to the sensing wheel in order to test the limits of traction, and the results of such tests can be used as a basis for estimating friction by a variety of friction estimation techniques, including those that are currently known and those that may be developed later.

In some implementations, the friction parameter may be modified to correct for errors introduced by friction measurement at the reduced downward force Fz. As an example, a coefficient of friction determined at the reduced downward force Fz may be reduced slightly, resulting in a conservative estimate of friction at nominal values for the downward force Fz.

In some implementations, control is applied to the tires 102 to counteract any disturbance caused by actuation of the sensing wheel. As an example, disturbance control may include ensuring that the yaw moment of the vehicle 100 about its Z axis does not change during friction estimation, or that the change in yaw moment is reduced. By counteracting disturbances, the trajectory of the vehicle does not change (e.g., maintaining velocity, acceleration, jerk, yaw rate, etc.).

Actuation of one or more of the tires 102 to avoid disturbance can be implemented according to a cost minimization technique.

In particular, actuating the sensing tire (or tires) for friction estimation however prevents it from being used completely for vehicle control, and may cause the vehicle 100 to depart slightly from an intended trajectory. Thus, one or more of the tires 102 (which may or may not include the sensing tire) are actuated to counter the disturbances caused by actuation of the sensing tire. As one example, actuating the tires 102 to counter a disturbance caused by sensing may include counter steering to counter unnecessary moments that have been generated due to loss of traction from the sensing tire. As one example, actuating the tires 102 to counter a disturbance caused by sensing may including brake blending the remaining wheels. Brake blending is a type of torque vectoring control in which varying amounts of braking force are distributed among the tires 102 to create negating longitudinal traction forces. For example, if the vehicle is traveling straight and the front right tire is the designated sensing tire, then the vehicle 100 will turn right due to the loss of longitudinal traction at the front right tire road interface. A counter moment can be applied as described above to negate the moment that would otherwise cause the rightward turn.

In some implementations, the sensing tire can counter disturbance while being actuated to measure friction. For example, the sensing could be steered contrary to a moment caused by lost traction as a result of the reduced downward force Fz.

In some implementations, the sensing tire could be changed to counter disturbance. For example, sensing using a first one of the tires 102 may cause a disturbance having a first direction and magnitude, and the sensing tire can be switched to a different one of the tires to cause a countering disturbance in a second, opposite direction and at a similar magnitude.

FIGS. 7A-7D are illustrations that show examples in which a yaw moment (i.e., z-axis moment) caused by a reduced downward force applied to one of the tires of the vehicle 100 is opposed by counter-steering. In the illustrated examples, a reduced downward force (F_low) is applied to the front left tire 102-a using the active suspension components 104 (not shown in FIGS. 7A-7D), which results in an increased downward force (F_high) applied to the front right tire 102-b and redistribution of forces to the rear left tire 102-c and the rear right tire 102-d. This induces a moment in the counterclockwise direction relative the center of mass of the vehicle 100 around the z-axis.

Figure 7A:
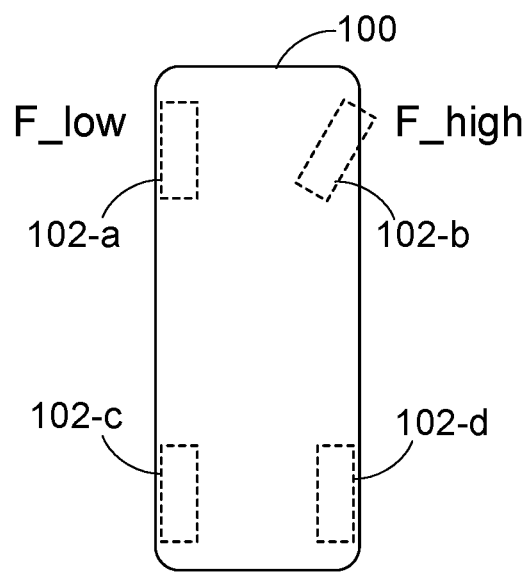
FIGS. 7A-7D are illustrations that show examples in which a yaw moment caused by a reduced downward force applied to one of the tires of the vehicle is opposed by counter-steering.
Figure 7B:
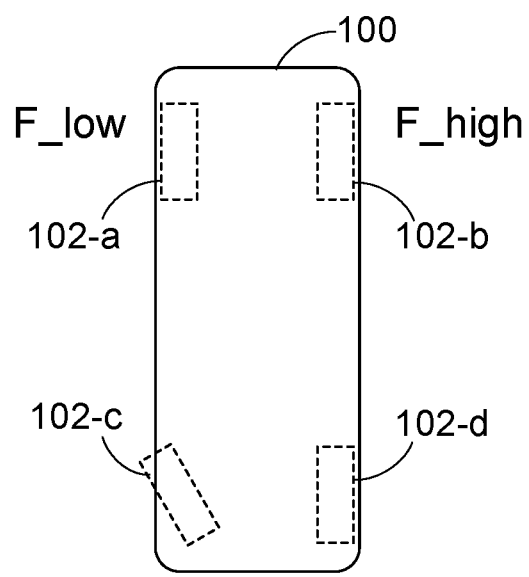
Figure 7C:
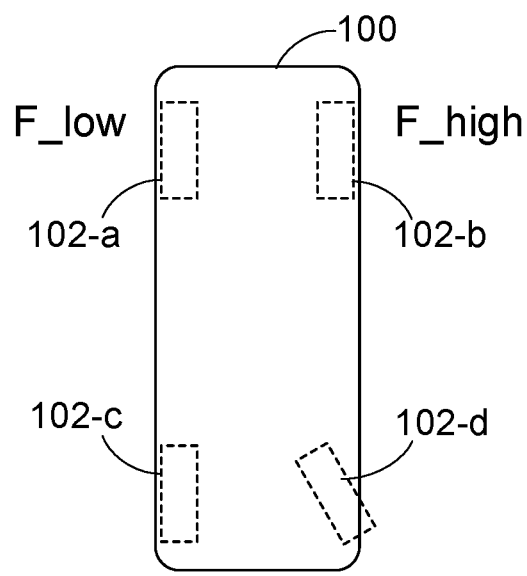
Figure 7D:
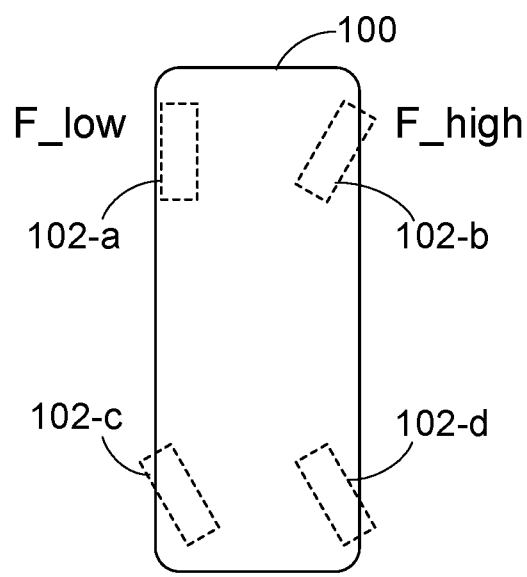

In FIG. 7A, the front right tire 102-b is steered to the right to counter the moment induced by the reduced downward force (F_low) applied to the front left tire 102-a. In FIG. 7B, the rear left tire 102-c is steered to the left to counter the moment induced by the reduced downward force (F_low) applied to the front left tire 102-a. In FIG. 7C, the rear right tire 102-d is steered to the left to counter the moment induced by the reduced downward force (F_low) applied to the front left tire 102-a. In FIG. 7D, to counter the moment induced by the reduced downward force (F_low) applied to the front left tire 102-a, the front right tire 102-b is steered to the right, the rear left tire 102-c is steered to the left, and the rear right tire 102-d is steered to the left.

It should be understood that the counter-steering configurations shown in FIGS. 7A-7D are only examples of control that can be applied to counter the yaw moment induced by redistributing the downward forces applied to the tires. The same types of control strategies can be applied when changing the force distributions to other tires, and independent control of some or all of the steering angles of the tires can be used to apply counter-moments. In addition, torque vectoring can be applied at some or all of the tires to apply counter-moments.

While discussed with respect to one tire, the techniques proposed above can be performed by reducing the force on multiple tires as well. For example, if a road surface varies in the lateral direction, the friction coefficient of opposing sides of the road may be determined using the above proposed techniques on tires located on opposing sides of the vehicle 100. In these implementations, the downward force may be reduced first in one of the multiple tires and second in another of the multiple tires. The friction determination unit 116 can then instruct the torque control unit 114 to modulate the torque applied first in the one of the multiple tires and second in the other of the multiple tires. The friction determination unit 116 may sample the traction force at various slip ratios at each tire to determine the maximum available traction force at each of the two tires. The friction determination unit 116 may then calculate the coefficient of friction at each tire/surface interface based on the maximum available traction force at each respective tire and the downward force applied to each respective tire.

While FIG. 1A illustrates a vehicle 100 having a respective motor 108 applying torque to each respective tire 102, the techniques described herein may be applied to any other suitable configuration of vehicle, whether electric, hybrid, or gas powered, provided the vehicle 100 is configured with the ability to reduce the downward force on one or two of the tires and to independently modulate torque to one or two of the tires.

What is claimed is:

1. A method for controlling a vehicle having a set of tires, the method comprising:
   applying torque to one or more tires from the set of tires to cause the vehicle to move along a surface;
   reducing an amount of downward force applied to the surface by a first tire from the set of tires using an active suspension component to define a reduced downward force for the first tire;
   while the first tire is at the reduced downward force, controlling a dynamic response of the first tire relative to the surface using one or more actuators to vary a magnitude of the dynamic response of the first tire relative to the surface;
   determining, using one or more sensors, and while controlling the dynamic response of the first tire using the one or more actuators, multiple traction force values that each represent traction of the first tire relative to the surface at a different value of the magnitude of the dynamic response of the first tire relative to the surface;
   determining a maximum available traction force based on the multiple traction force values and corresponding values for the magnitude of the dynamic response;
   determining a friction parameter for the first tire relative to the surface based on the maximum available traction force and the reduced downward force; and
   controlling an operation of the vehicle based on the friction parameter.

2. The method of claim 1, wherein the dynamic response of the first tire is a longitudinal slip ratio.

3. The method of claim 2, wherein controlling the dynamic response of the first tire includes changing an amount of torque applied to the first tire.

4. The method of claim 2, wherein controlling the dynamic response of the first tire includes changing a braking torque applied to the first tire.

5. The method of claim 2, wherein controlling the dynamic response of the first tire includes steering the first tire to maintain a lateral traction force equal to a constant value while changing a longitudinal traction force.

6. The method of claim 1, wherein the dynamic response of the first tire is a slip angle.

7. The method of claim 6, wherein controlling the dynamic response of the first tire includes changing a steering angle of the first tire.

8. The method of claim 7, wherein controlling the dynamic response of the first tire includes changing a torque applied to the first tire to maintain a longitudinal traction force equal to a constant value while changing a lateral traction force.

9. The method of claim 1, wherein the dynamic response of the first tire includes a longitudinal slip ratio and a slip angle, and controlling the dynamic response of the first tire includes at least one of changing a torque applied to the first tire, changing a braking torque applied to the first tire, or changing a steering angle of the first tire.

10. The method of claim 1, further comprising:
applying, to one or more tires from the set of tires, a counter-moment in opposition to a moment resulting from controlling the dynamic response of the first tire relative to the surface.

11. A vehicle comprising:
a set of tires that includes a first tire;
one or more motors that are configured to apply torque to one or more tires from the set of tires;
an active suspension component that is configured to control an amount of downward force that is applied to the first tire; and
a controller that executes a set of instructions that cause the controller to:
apply torque to one or more tires from the set of tires to cause the vehicle to move along a surface,
reduce an amount of downward force applied to the surface by a first tire from the set of tires using an active suspension component to define a reduced downward force for the first tire,
control a dynamic response of the first tire relative to the surface using one or more actuators to vary a magnitude of the dynamic response of the first tire relative to the surface while the first tire is at the reduced downward force,
determine, using one or more sensors and while controlling the dynamic response of the first tire using the one or more actuators, multiple traction force values that each represent traction of the first tire relative to the surface at a different value of the magnitude of the dynamic response of the first tire relative to the surface,
determine a maximum available traction force based on multiple traction force values and corresponding values for the magnitude of the dynamic response,
determine a friction parameter for the first tire relative to the surface based on the maximum available traction force and the reduced downward force, and
control an operation of the vehicle based on the friction parameter.

12. The vehicle of claim 11, wherein the dynamic response of the first tire is a longitudinal slip ratio and control of the dynamic response of the first tire relative to the surface includes at least one of changing an amount of torque applied to the first tire or changing a braking torque applied to the first tire.

13. The vehicle of claim 11, wherein the dynamic response of the first tire is a slip angle and control of the dynamic response of the first tire relative to the surface includes changing a steering angle of the first tire and changing a torque applied to the first tire to maintain a longitudinal traction force equal to a constant value while changing a lateral traction force.

14. The vehicle of claim 11, wherein the dynamic response of the first tire includes a longitudinal slip ratio and a slip angle, and control of the dynamic response of the first tire relative to the surface includes at least one of changing a torque applied to the first tire, changing a braking torque applied to the first tire, or changing a steering angle of the first tire.

15. The vehicle of claim 11, wherein the instructions further cause the controller to apply, to one or more tires from the set of tires, a counter-moment in opposition to a moment resulting from control of the dynamic response of the first tire relative to the surface.

16. A non-transitory computer readable media including program instructions, wherein the program instructions, when executed by a processor, cause the processor to perform operations, the operations comprising:
applying torque to one or more tires from a set of tires to cause a vehicle to move along a surface;
reducing an amount of downward force applied to the surface by a first tire from the set of tires using an active suspension component to define a reduced downward force for the first tire;
while the first tire is at the reduced downward force, controlling a dynamic response of the first tire relative to the surface using one or more actuators to vary a magnitude of the dynamic response of the first tire relative to the surface;
determining, using one or more sensors and while controlling the dynamic response of the first tire using the one or more actuators, multiple traction force values that each represent traction of the first tire relative to the surface at a different value of the dynamic response of the first tire relative to the surface;
determining a maximum available traction force based on the multiple traction force values and corresponding values for the magnitude of the dynamic response;
determining a friction parameter for the first tire relative to the surface based on the maximum available traction force and the reduced downward force; and
controlling an operation of the vehicle based on the friction parameter.

17. The non-transitory computer readable media of claim 16, wherein the dynamic response of the first tire is a longitudinal slip ratio and controlling the dynamic response of the first tire relative to the surface includes at least one of changing an amount of torque applied to the first tire or changing a braking torque applied to the first tire.

18. The non-transitory computer readable media of claim 16, wherein the dynamic response of the first tire is a slip angle and controlling the dynamic response of the first tire relative to the surface includes changing a steering angle of the first tire and changing a torque applied to the first tire to maintain a longitudinal traction force equal to a constant value while changing a lateral traction force.

19. The non-transitory computer readable media of claim 16, wherein the dynamic response of the first tire includes a longitudinal slip ratio and a slip angle, and controlling the dynamic response of the first tire relative to the surface includes at least one of changing a torque applied to the first tire, changing a braking torque applied to the first tire, or changing a steering angle of the first tire.

20. The non-transitory computer readable media of claim 16, further comprising:
applying, to one or more tires from the set of tires, a counter-moment in opposition to a moment resulting from controlling the dynamic response of the first tire relative to the surface.

* * * * *